United States Patent
Frields

(10) Patent No.: US 6,286,584 B1
(45) Date of Patent: Sep. 11, 2001

(54) QUICK-CHANGE MECHANISM FOR A TIE BAR

(76) Inventor: James A. Frields, 13310 Hwy. 351 East, Henderson, KY (US) 42420

( * ) Notice: Subject to any disclaimer, the term of this patent is extended or adjusted under 35 U.S.C. 154(b) by 0 days.

(21) Appl. No.: 09/277,115

(22) Filed: Mar. 26, 1999

Related U.S. Application Data

(60) Provisional application No. 60/092,859, filed on Jul. 15, 1998.

(51) Int. Cl.$^7$ .......................... B22D 33/04; B22D 17/26; B25B 5/16
(52) U.S. Cl. ..................... 164/137; 164/312; 164/342; 269/268
(58) Field of Search ..................... 164/312, 342, 164/341, 339, 306, 137; 269/27, 249, 267, 299, 287, 268, 25

(56) References Cited

U.S. PATENT DOCUMENTS

| Re. 32,048 | 12/1985 | Prince | 164/154 |
|---|---|---|---|
| 1,425,275 | * 8/1922 | Paulsen . | |
| 3,362,733 | 1/1968 | Klara | 287/52 |
| 3,626,506 | 12/1971 | Spleth | 281/52 |
| 4,185,539 | 1/1980 | Stratienko | 91/45 |
| 4,264,229 | 4/1981 | Falk et al. | 403/5 |
| 4,285,384 | 8/1981 | Wunder | 164/1 |
| 4,425,050 | 1/1984 | Durand | 403/15 |
| 4,598,758 | 7/1986 | Nyland et al. | 164/154 |
| 4,716,952 | 1/1988 | Hegel et al. | 164/154 |
| 5,125,776 | 6/1992 | Müller et al. | 409/234 |
| 5,192,557 | 3/1993 | Hirata et al. | 425/589 |
| 5,263,531 | 11/1993 | Drury et al. | 164/720 |
| 5,429,446 | 7/1995 | Challis | 403/31 |
| 5,542,465 | 8/1996 | Wolniak | 164/341 |
| 5,590,891 | 1/1997 | Kazmark, Jr. | 280/37 |
| 5,641,238 | 6/1997 | Oswald | 403/359 |

OTHER PUBLICATIONS

James A. Frields, drawing of a "Double Cylinder Quick–Change Clamp Asm.," in existence before Jul. 15, 1997 and representing a device that was in public use and sold before Jul. 15, 1997.

* cited by examiner

Primary Examiner—Tom Dunn
Assistant Examiner—Len Tran
(74) Attorney, Agent, or Firm—Woodard, Emhardt, Naughton, Moriarty & McNett

(57) ABSTRACT

A casting machine is disclosed having a quick-change tie bar mechanism. This mechanism includes an actuator having a rod coupled to a first bearing member and a body coupled to a second bearing member. The first and second bearing members are configured to reciprocally move in opposite directions in response to extension and retraction of the rod relative to the body. The bearing members have a first configuration for engaging a nut threaded on a tie bar to fix the tie bar in relation to a platen through which the tie bar extends. The first and second bearing members also have a second configuration for releasing the tie bar to permit removal through the platen so that a part may be accessed for removal and/or replacement. In another embodiment, a number of platens are included as are a number of tie bars configured to guide movement of one of the platens relative to another.

24 Claims, 6 Drawing Sheets

QUICK-CHANGE MECHANISM FOR A TIE BAR

CROSS-REFERENCE TO RELATED APPLICATIONS

The present application claims the benefit of U.S. Provisional Application Serial No. 60/092,859 filed Jul. 15, 1998.

Commonly owned U.S. Provisional Patent Application No. 60/092,859, filed Jul. 15, 1998 of which the benefit is claimed herein is hereby incorporated by reference in its entirety.

BACKGROUND OF THE INVENTION

The present invention relates to casting and molding systems, and more particularly, but not exclusively, relates to a mechanism to more efficiently interchange parts of a casting or molding machine.

One common type of casting machine includes four tie bars that guide vertical movement of one platen relative to another. U.S. Pat. No. 4,716,952 to Hegel et al. and U.S. Pat. No. 5,263,531 to Drury et al. are cited as additional sources of background information concerning such devices and their operation. To change casting parts for this type of machine, usually at least one of the tie bars needs to be removed. The process of disassembling a tie bar from the machine to change parts is generally very time-intensive and costly. Thus, there is a need to provide a quicker way to remove casting machine tie bars.

Some attempts to improve the removal of tie bars have included devices of the type described in U.S. Pat. No. 5,192,557 to Hirata et al. and U.S. Pat. No. 5,542,465 to Wolniak. Unfortunately, these devices are exceedingly complex, including multiple actuators and a large number of moving parts that take up an excessive amount of space. Also, devices of this type typically do not provide for the independent adjustment of a nut threaded on an end portion of the tie bar to accommodate changes in tie bar tension while the tie bar is assembled in the machine. Thus, there remains a need for a better tie bar clamping or holding device. Preferably, such a device would facilitate turning a nut threaded on the tie bar to adjust tic bar tension.

SUMMARY OF THE INVENTION

One form of the present invention includes a unique casting or molding machine having a releasable tie bar clamping or holding mechanism. Alternatively or additionally, another form of the present invention is a unique technique to selectively hold and remove a tie bar.

In a further form, a mechanism has a pair of bearing members and an actuator. The actuator is coupled to each of the bearing members and is operable to reciprocally move the bearing members in opposite directions. Accordingly, the mechanism may be utilized to move the bearing members towards each other to facilitate holding or clamping of a structure and to move the bearing members away from each other to release the structure. This mechanism may be arranged to align with an opening of a platen through which a tie bar is passed, such that the bearing members are positioned on opposite sides of the tie bar extending through the opening. A nut may be threaded on the tie bar to bear against the bearing members and correspondingly hold the tie bar in fixed relation to the platen.

Accordingly, it is one object of the present invention to provide a unique casting or molding machine having a releasable clamping or holding apparatus.

It is another object of the present invention to provide a unique technique for holding and selectively removing a tie bar.

It is still another object to provide a quick-change mechanism for a tie bar. Further objects, features, forms, aspects, benefits, and advantages of the present invention shall become apparent from the description and drawings contained herein.

DESCRIPTION OF THE PREFERRED EMBODIMENTS

Figure 1:
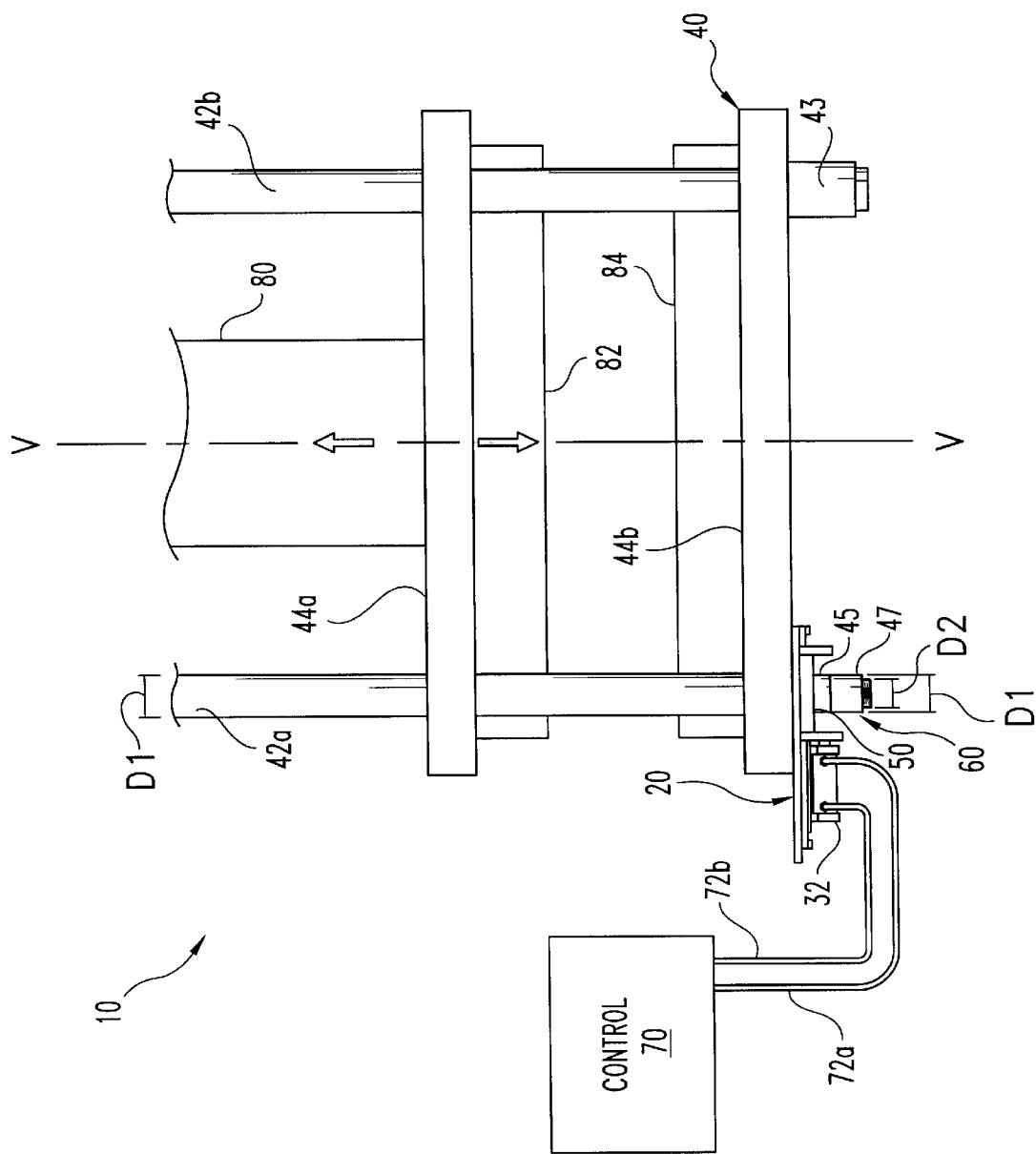
FIG. 1 is a partial, diagrammatic side view of a casting system of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts die casting system 10 including quick-change mechanism 20 and casting machine 40 (partially shown). Mechanism 20 is operably coupled to machine 40 for releasably holding a quick-change tie bar 42a of machine 40. Machine 40 also includes three tie bars 42b. Only one of tie bars 42b is shown in FIG. 1, with the other two each being directly behind a corresponding one of tie bars 42a, 42b depicted. Preferably tie bars 42a, 42b are each positioned to generally coincide with a corner of an imaginary rectangle or square in a standard manner like the tie bar and platen arrangement shown in U.S. Pat. No. 5,542,465 to Wolnaik. Machine 40 includes moveable platen 44a and base platen 44b that are in engagement with tie bars 42a, 42b. Tie bars 42a, 42b each have a generally circular cross section, and each tie bar 42a, 42b passes through an opening through platen 44a and an opening through platen 44b. Tie bars 42a, 42b are each rigidly fixed to platen 44b when performing a casting operation with machine 40. In contrast, platen 44a is arranged to reciprocally travel along tie bars 42a, 42b relative to platen 44b during casting operations. Tie bars 42a, 42b guide and align platen 44a as it travels. Hydraulic cylinder 80 (partially shown) is coupled to platen 44a to control movement along tie bars 42a, 42b in a standard manner.

Tie bar 42b has a threaded end arranged for engagement by a corresponding nut 43. Tie bar 42b is maintained in a fixed relationship with platen 44b for casting operations by threading nut 43 on tie bar 42b and tightening nut 43 so that it bears against platen 44b. Nut 43 is sized to have an outside diameter that is larger than the maximum outside diameter D1 of each tie bar 42a, 42b in order to bear against platen 44b. Quick-change tie bar 42a is also coupled to platen 44b; however, lower end portion 60 of tie bar 42a is threaded and engaged by nut 45. Nut 45 may be tightened to selectively bear against mechanism 20 as will be more fully described in connection with FIGS. 3–6 hereinafter. End portion 60 has diameter D2 which is less than maximum diameter D1 of bars 42a, 42b (D2<D1). Nut 45 is sized so that it may be withdrawn through an aperture having a diameter no greater than D1 when nut 45 is threaded on end portion 60. Correspondingly, the maximum dimension of nut 45 transverse to tie bar 42a when threaded thereon is smaller than D1. Lock nut 47 is threaded on end portion 60 of tie bar 42a adjacent nut 45 to provide a locking action. Preferably, lock nut 47 also has a maximum dimension transverse to tie bar 42a that is also smaller than D1. Likewise, lock nuts may be used to secure each nut 43 in place. Nuts 43, 45 may be turned while in a bearing relationship with platen 44b to adjust tension of tie bars 42a, 42b during performance of casting operations with machine 40.

Platens 44a, 44b are typically rectangular in shape; however, in other embodiments, platens 44a, 44b may be shaped and arranged differently as would occur to those skilled in the art. Preferably, the ends of tie bars 42a, 42b not shown in FIG. 1 are secured to a plate, frame, or other member as is known in the art. Also, casting machine 40 may include more or fewer tie bars 42a, 42b and/or other geometric arrangements of bars 42a, 42b as would occur to those skilled in the art.

Machine 40 is preferably oriented to provide for generally vertical travel of platen 44a along axis VV. Alternatively, machine 40 may be oriented for generally horizontal travel of platen 44a or travel of platen 44a along another direction as would occur to those skilled in the art. Various other parts 82, 84 are attached to platens 44a, 44b, respectively. Parts 82, 84 may be die casting elements, molds, or other machine constituents. It is usually desirable to remove one or more of parts 82, 84 from time-to-time for cleaning and reinstallation, or to exchange with other parts; however, one of tie bars 42a, 42b typically needs to be displaced to facilitate removal and replacement of parts 82, 84.

Figure 2:
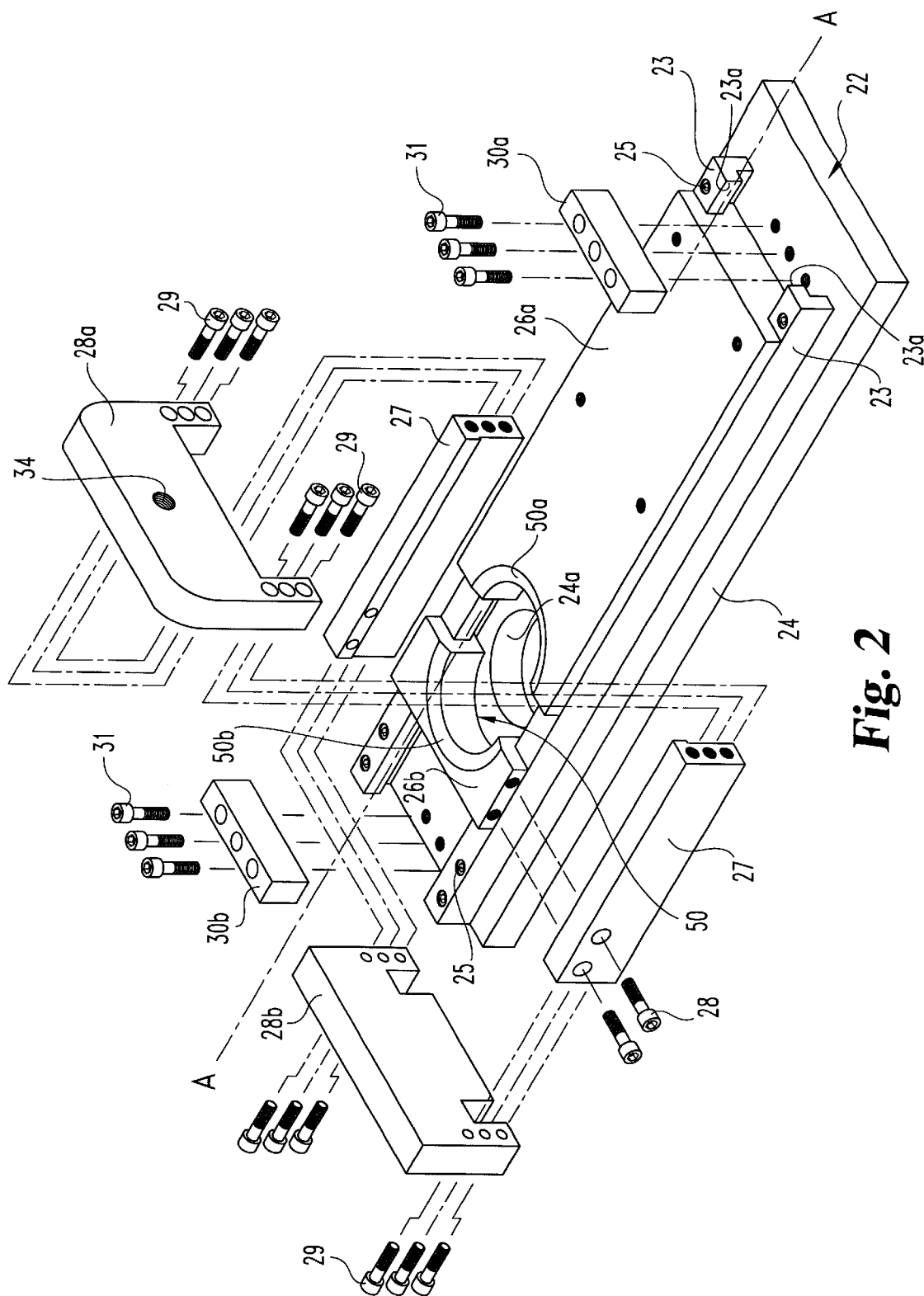
FIG. 2 is a partial, exploded perspective view of a mechanism of the system of FIG.

The selective fixation and displacement of tie bar 42a is facilitated by mechanism 20. Mechanism 20 is mounted to machine 40 by screws (not shown) to releasably hold or clamp tie bar 42a in fixed relation to platen 44b. Referring additionally to FIG. 2, a partial exploded view of mechanism 20 is provided. FIG. 2 shows mechanism 20 in an inverted orientation relative to FIG. 1 and without other portions of system 10 to enhance clarity. Mechanism 20 includes base 22 in the form of mounting plate 24 with hole 24a sized to clear the outside diameter of tie bar 42a with nuts 45, 47 threaded thereon. Guide rails 23 are attached to plate 24 by screws 25. Rails 23 are generally straight and are spaced apart from one another a generally constant distance. Rails 23 each have a cross section taken along axis AA that generally has an inverted L-shape with an inwardly protruding flange 23a. Rails 23 are positioned opposite each other about hole 24a. Nonetheless, in other embodiments, rails 23 may be arranged or shaped differently as would occur to those skilled in the art.

Mechanism 20 also includes blocks 26a, 26b configured to slidably engage rails 23. Block 26a, 26b are assembled to slide between rails 23 along axis AA. Each block 26a, 26b has a pair of opposing rail engaging portions with a generally C-shaped cross section taken along axis AA to engage flange 23a of a corresponding one of rails 23. Preferably, blocks 26a, 26b and rails 23 are sized so that blocks do not make substantial contact with plate 24 when engaged to flanges 23a of rails 23. Blocks 26a, 26b each define a corresponding tapered collar portion 50a, 50b that collectively define tapered collar 50. Collar portions 50a, 50b define passage 51 therebetween that is aligned and intersects hole 24a.

The size and shape of collar 50 and passage 51 vary with any change in spacing between collar portion 50a and collar portion 50b as blocks 26a, 26b correspondingly move relative to each other along rails 23. Preferably, the taper of collar portion 50a, 50b is contoured to compliment a contacting face of nut 45. It is also preferred that collar portions 50a, 50b each be Contoured to define a semicircular end surface opposite one another.

Mechanism 20 also includes opposing bridle rails 27 attached to block 26b by screws 28. Bridle rails 27 are each positioned to travel along an outer side of a corresponding one of rails 23. Bridle rails 27 are connected to end plates 28a, 28b at opposing ends by screws 29. End plate 28a extends over block 26a to couple to each bridle rail 27 and abuts block 26b. End plate 28b abuts block 26b and includes two slots to receive rails 23 therein. Once assembled, block 26b, bridle rails 27, and end plates 28a, 28b travel together along axis AA.

Stops 30a, 30b are attached to plate 24 by screws 31 opposite one another between rails 23. Stops 10a, 30b are arranged to limit travel of blocks 26a, 26b along rails 23 and contain blocks 26a, 26b between rails 23. While, stops 30a, 30b are shown generally spanning the entire distance between rails 23, in other embodiments, stops 30a, 30b may only occupy a portion of this distance or may otherwise be configured to limit travel of blocks 26a, 26b. In one alternative embodiment, the ends of rails 23 are shaped to limit the travel of blocks 26a, 26b, and stops 30a, 30b are not utilized. Preferably, rails 23, 27; plates 24, 28a, 28b; blocks 26a, 26b; and stops 30a, 30b are made from steel; however, alternative materials as would occur to those skilled in the art are also contemplated.

Figure 3:
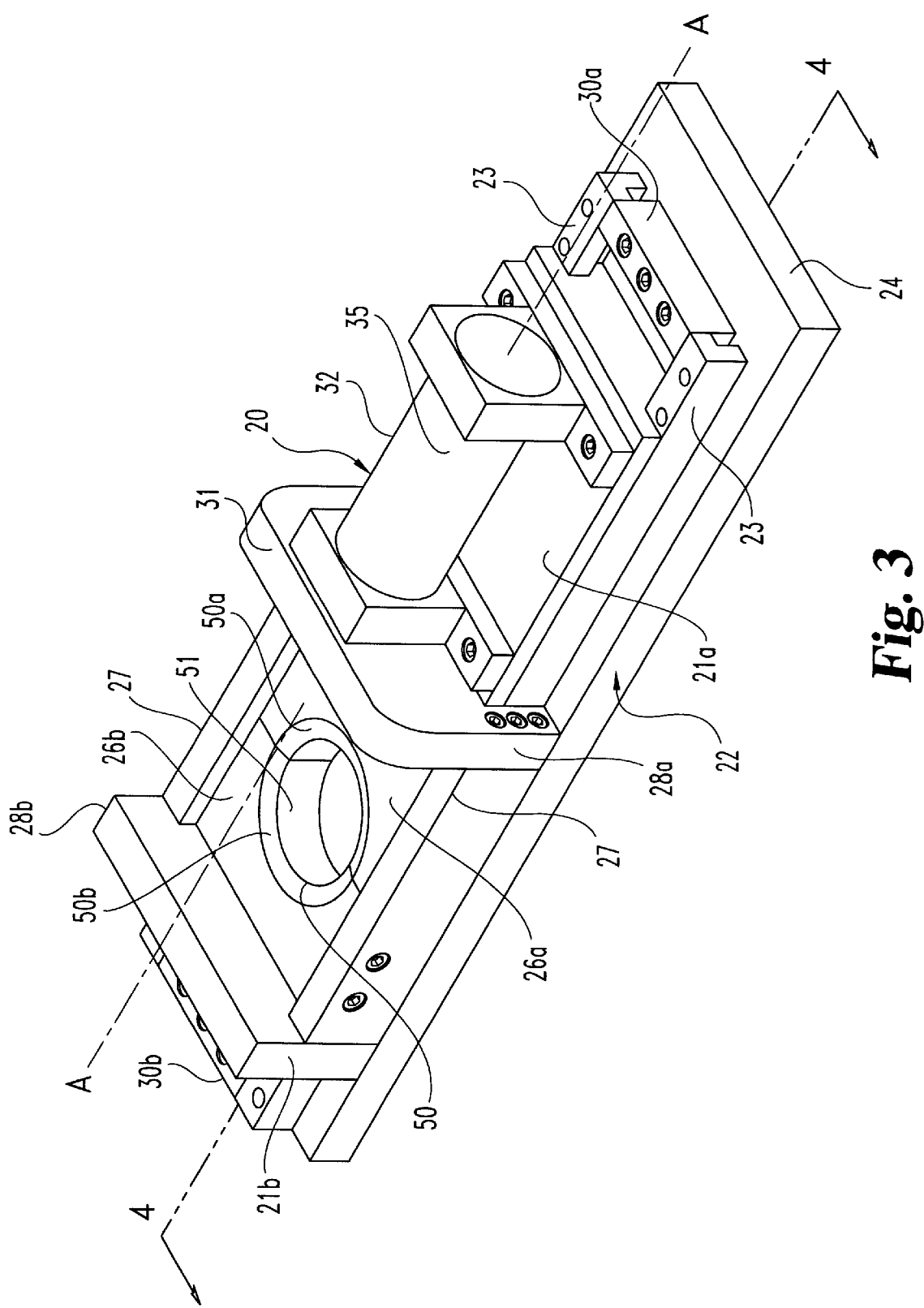
FIG. 3 is a perspective view of the mechanism of FIG. 2 shown in a closed, holding configuration.
Figure 5:
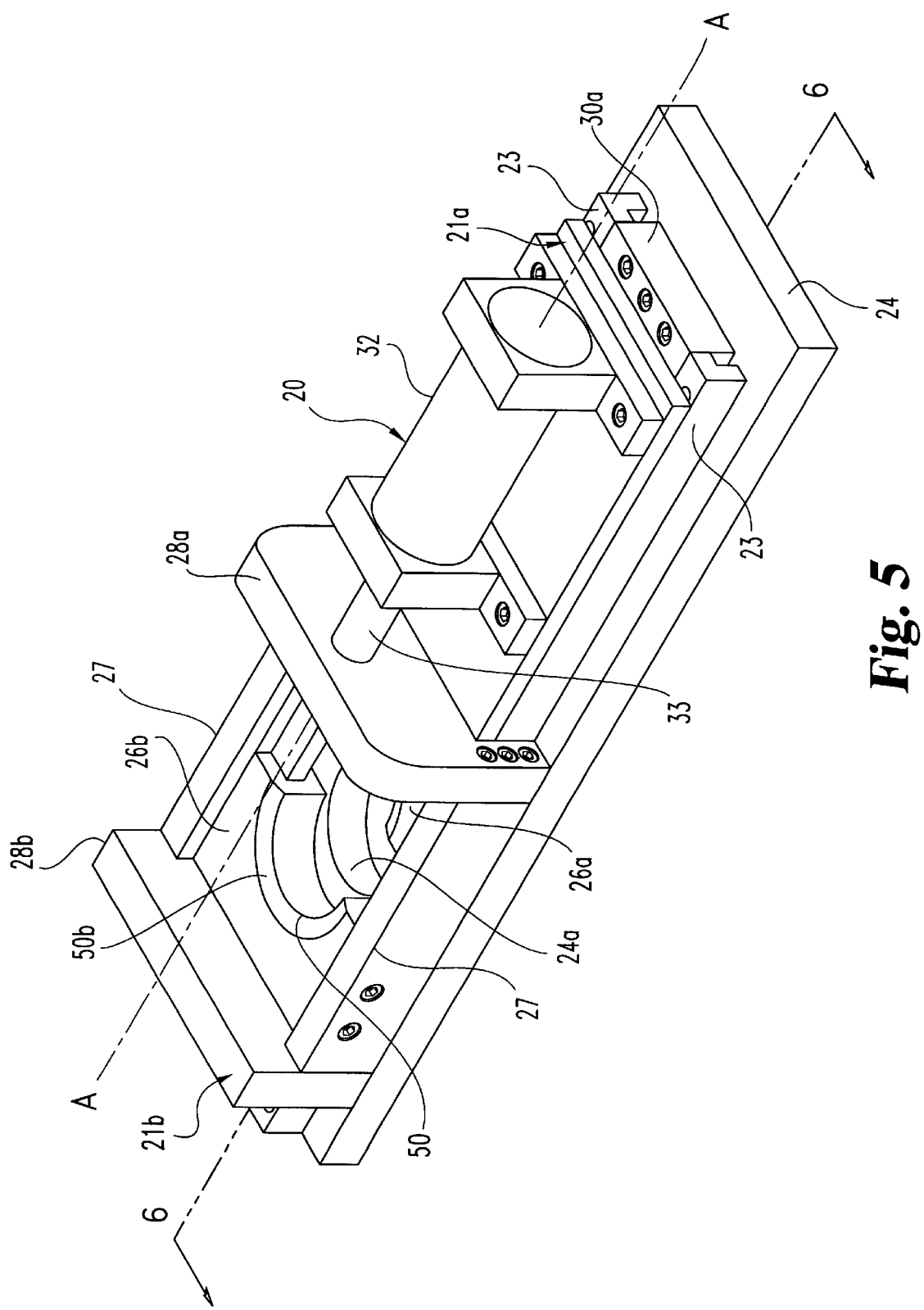
FIG. 5 is a perspective view of the mechanism of FIG. 2 shown in an open, releasing configuration.

Referring to FIGS. 1, 3, 5; mechanism 20 is shown with double-acting hydraulic cylinder actuator 32. As in the case of FIG. 2, FIGS. 3 and 5 are inverted and only show selected portions of system 10 to enhance clarity. Actuator 32 includes a threaded plunger stem or rod 33 threaded into threaded hole 34 defined by end plate 28a. Actuator 32 also includes body 35 fixedly connected to plate 26a. Referring specifically to FIG. 1, actuator 32 is coupled to control 70 by hydraulic lines 72a, 72b. Control 70 includes a standard hydraulic pump, and an electromechanical interface of a standard type to control actuator 32 in the usual maimer for a double-acting hydraulic cylinder. Correspondingly, rod 33 is selectively extended and retracted relative to body 35 along axis AA in response to activation by control 70. In other embodiments, a different type of actuator may be used such as a pneumatic device or a device that electromagnetically extends and/or retracts a stem or rod, to name only a few. Control 70 and lines 72a, 72b could likewise be adapted to accommodate such alternative actuator types.

Referring again to FIGS. 3 and 5, block 26a is arranged to serve as a bearing member 21a. Collectively, block 26b, bridle rails 27, and end plates 28a, 28b comprises another form of a bearing member designated by reference numeral 21b. End plate 28a of bearing member 21b includes bridge portion 31 spanning across block 26a of bearing member 21a generally transverse to axis AA. Bearing members 21a, 21b move in opposite directions along rails 23 and between stops 30a, 30b in response to extension or retraction of rod 33 relative to body 35 of actuator 32. Rod 33 may be repositioned relative to body 35 to change the distance separating collar portion 50a and collar portion 50b adjacent hole 24a. Correspondingly, different positions of rod 33 relative to body 35 provide different configurations of bearing members 21a, 21b. Of particular interest are the closed or holding configuration of bearing members 21a, 21b shown in FIGS. 3 and 4 and the open or releasing configuration of bearing members shown in FIGS. 5 and 6.

Figure 4:
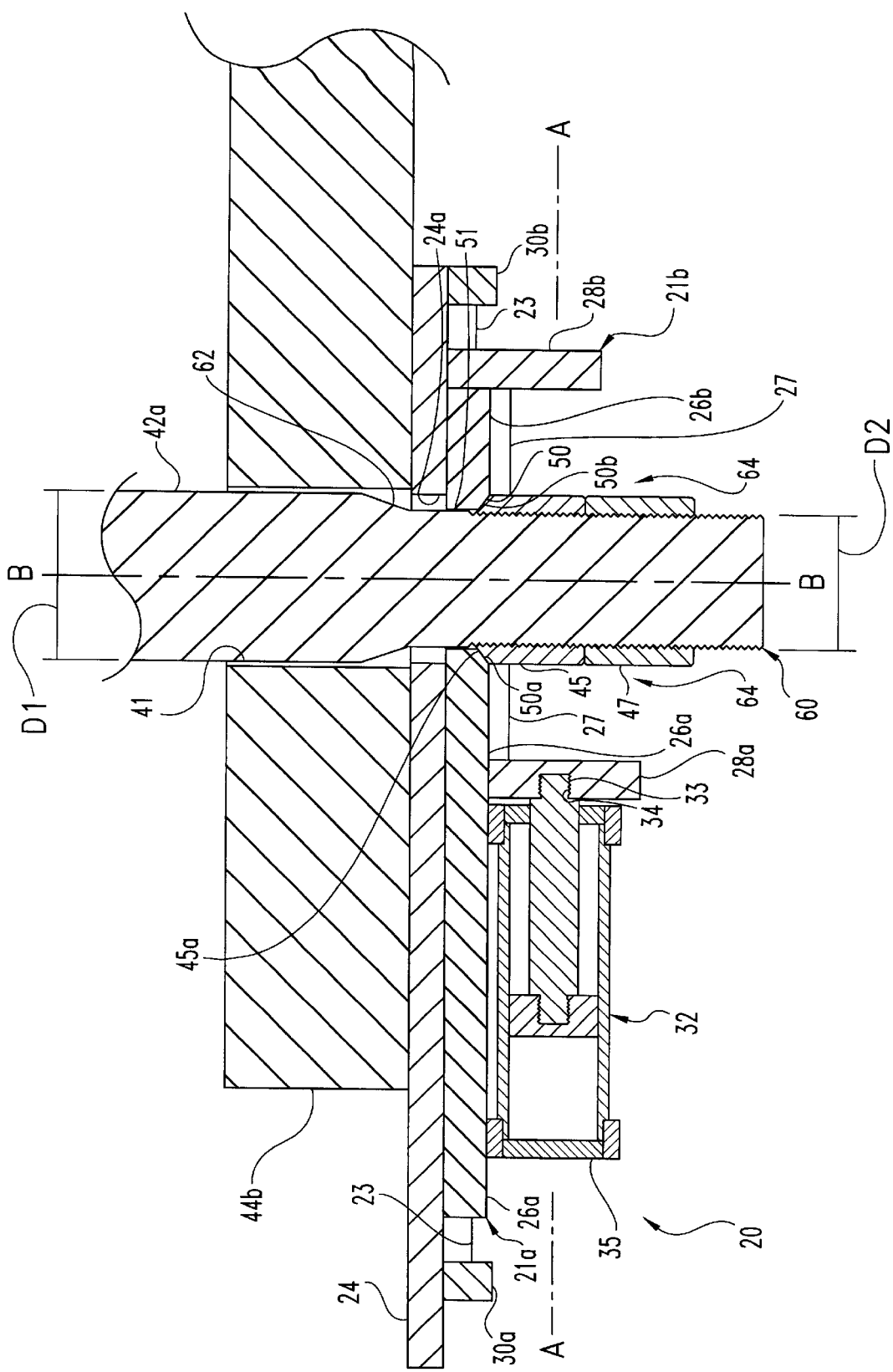
FIG. 4 is a partial, sectional view taken along section line 4—4 of FIG. 3.

Referring to FIGS. 3 and 4, selected aspects of the holding configuration are shown. FIG. 4 is a partial, cross-sectional view taken along section line 4—4 of FIG. 3 and further includes portions of platen 44b, tie bar 42a, and nuts 45, 47. For the holding configuration, rod 33 is retracted into body 35 of actuator 32 so that body 35 and end plate 28a are in close proximity to one another. The relationship of mechanism 20 to platen 44b and tie bar 42a is further detailed in FIG. 4. Tie bar 42a has a centerline axis BB that is preferably generally perpendicular to axis AA of mechanism 20. Platen 44b defines opening 41 therethrough. Opening 41 is aligned with hole 24a through plate 24 and passage 51 through collar 50. Correspondingly, tie bar 42a passes through opening 41, hole 24a, and passage 51. As previously described, tie bar 42a necks down with a progressively smaller diameter at transition region 62 as end portion 60 is approached along axis BB.

Nut 45 includes a sloped contacting face 45a arranged to engage tapered collar 50 defined by collar portions 50a, 50b of bearing members 21a, 21b, respectively. The obliquely sloped or ramped surfaces of collar 50 and nut 45 relative to axis BB of tie bar 42a and axis AA assist in the proper alignment and seating of tie bar 42a and nut 45 relative to mechanism 20. Lock nut 47 is also shown tightened against nut 45.

Nut 45 is sized with a maximum dimension less than or equal to diameter D1 of the upper portion of tie bar 42a, such that nut 45 may pass through opening 41 and hole 24a while threaded on end portion 60. However, for the holding configuration, collar 50 and passage 51 are sized with a minimum dimension to prevent passage of nut 45 therethrough as shown in FIG. 4. While in the preferred embodiment, collar portion 50a, 50b are arranged to come together to define a generally circular collar 50 about passage 51. In other embodiments, collar 50 and portions 50a, 50b may be shaped and sized differently to selectively prevent the passage of nut 45 through opening 41 and hole 24a. For example, collar portions 50a, 50b could each have generally planar end surfaces that are spaced apart from each other such that only a portion of opposing sides of face 45a may be engaged thereby. In other examples, collar portions 50a, 50b may each be shaped with one or more protruding prongs to contact nut 45 while allowing passage of end portion therebetween, or otherwise shaped as would occur to those skilled in the art. Likewise, in alternative embodiments, blocks 26a, 26b may be differently shaped and arranged as would occur to those skilled in he art. Nut 47 may be sized to pass through opening 41 and hole 24a, or may be sized larger or smaller than nut 45. If nut 47 is larger, then it may need to be removed to withdraw tie bar 42a trough opening 41 or hole 24a. In still other embodiments, nut 45 may be sized in a manner requiring removal before withdrawal of tie bar 42a through opening 41 or hole 24a.

For the holding configuration of FIG. 4, bearing members 21a, 21b are arranged to define working space 64 about nuts 45, 47 to facilitate access for tightening or loosening nuts 45, 47 while bearing members 21a, 21b are in the holding configuration. This operation may include applying a conventional tool (not shown) to turn nut 45 or nut 47. By accommodating such an operation, tension of tie bar 42a may be correspondingly adjusted. Rod 33 is in a retracted position in body 35 when in the holding configuration, with an end portion of rod 33 remaining threaded in hole 34 defined by plate 28a to maintain a fixed connection between rod 33 and bearing member 21b. In contrast, body 35 is fixed to bearing member 21a. A separation distance along axis AA between block 26a of bearing member 21a and stop 30a is about the same as the distance separating end plate 28b of bearing member 21b and stop 30b along axis AA, These separation distances correspond to the amount of distance bearing members 21a, 21b may travel along rails 23 between stops 30a, 30b.

Figure 6:
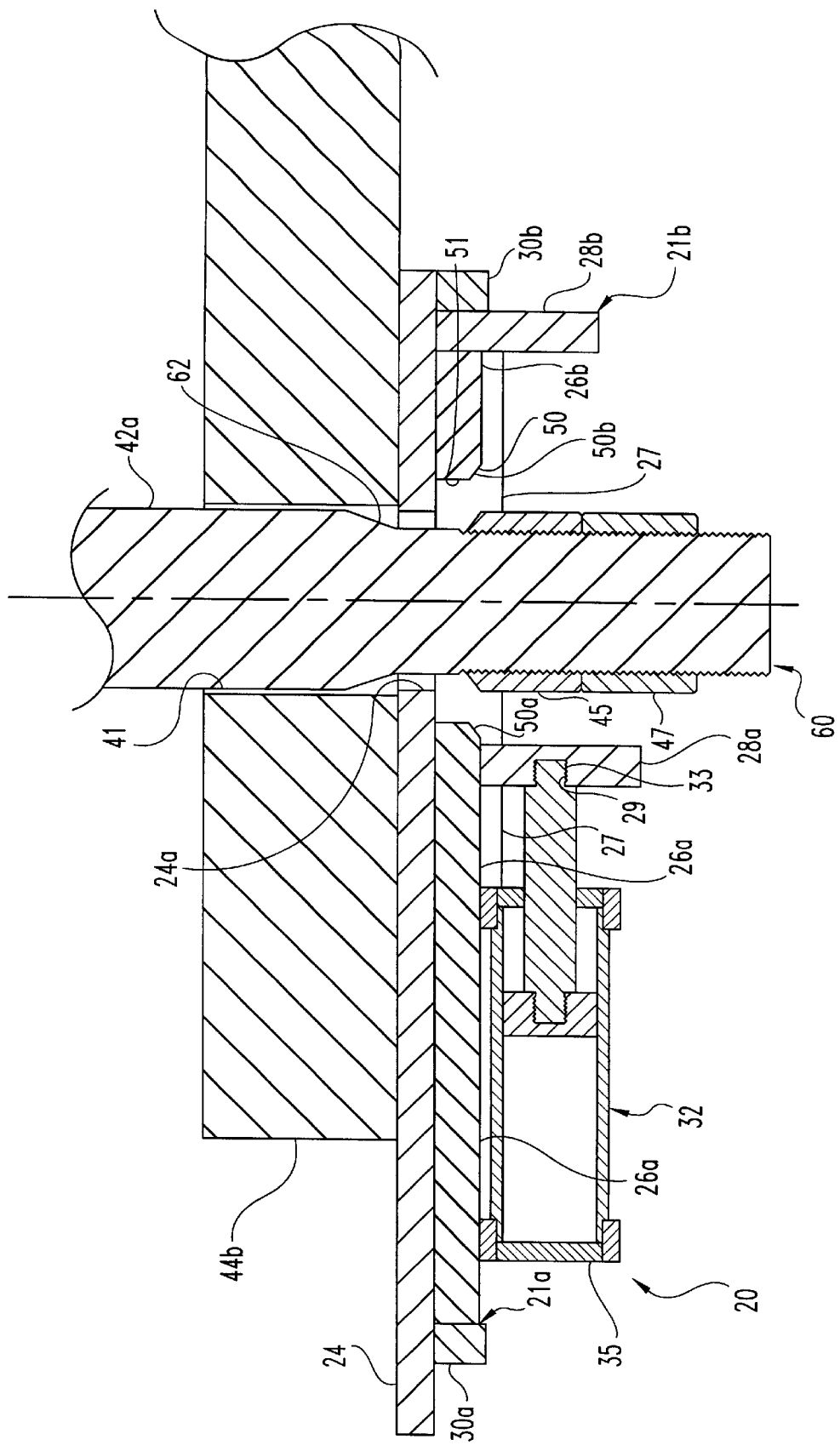
FIG. 6 is a partial, sectional view taken along section line 6—6 of FIG. 5.

Mechanism 20 selectively moves between the holding configuration shown in FIGS. 3 and 4 to the releasing configuration shown in FIGS. 5 and 6 through activation of actuator 32. In response to appropriate operator activation of control 70, rod 33 moves along axis AA from the retracted position for the holding configuration to an extended position for the releasing configuration. As rod 33 extends from body 35, it pushes against end plate 28a. Because of the fixed connection of block 26b to end plate 28a, bridle rails 27, and end plate 28b, they move together as bearing member 21b travels towards stop 30b. Extension of rod 33 also causes body 35 of actuator 32 and bearing member 21a to move along axis AA towards stop 30a. When transitioningfrom the holding configuration to the releasing configuration, bearing members 21a, 21b move in opposite directions along rails 23 away from one another and away from opening 41 and hole 24a. Correspondingly, the distance separating collar portions 50a, 50b increases along axis AA when going from the holding configuration to the releasing configuration. During transition, bearing members may move simultaneously or may each more alternatively. For example, if a greater resistance to the travel of one relative to the other is encountered, it may temporarily halt travel of that one while the other continues until the greater resistance is overcome or reduced. Preferably, the maximum extension of rod 3 from body 15 is slightly greater than that needed to move bearing member 21a into abutment with stop 30a and bearing member 21b into abutment with stop 30b (see FIGS. 5 and 6). For this preference, even if movement of one of the bearing members 21a, 21balong rails 23 is halted by resistance before it encounters its corresponding stop 30a, 30b, bearing contact between the other bearing member 21a, 21b and its corresponding stop 30a, 30b is likely to overcome such resistance until both bearing members 21a, 21b contact their respective stops 30a, 30b.

As members 21a, 21b move between the holding and releasing configurations they travel past one another. Specifically, bridge portion 31 of end plate 28a, passes adjacent block 26a during such transitions. This arrangement of members 21a, 21b may be characterized as a "stacked" relationship. For the embodiment depicted, the stacking is generally vertically oriented; however, it may alternatively be horizontal or otherwise oriented in accordance with the alignment of mechanism 20.

An extended position of rod 33 of actuator 32 is shown in FIGS. 5 and 6 with bearing members 21a, 21b abutting stops 30a, 30b, respectively. Correspondingly, collar portions 50a, 50b are separated by a greater distance than for the holding configuration and passage 51 has increased in size.

Passage 51 and collar portions 50a, 50b are arranged in the releasing configuration to permit withdrawal of tie bar 42a along axis BB through hole 24a and opening 41. Preferably, nuts 45, 47 are sized relative to passage 51, hole 24a, and opening 41 so that they may be withdrawn while still threaded on end portion 60 of tie bar 42a. Nut 45 and/or nut 47 may be loosened prior to attaining the releasing configuration. In other embodiments, nuts 45 or 47 may be removed before or after withdrawal of tie bar 42a through hole 24a and opening 41.

Once released, withdrawal of tie bar 42a may be performed with another hydraulic cylinder or small crane (not shown) to displace tie bar 42a a selected distance or remove it from machine 40 entirely; thereby facilitating removal and/or replacement of one or more of parts 82, 84 mounted on the platens 44a, 44b, respectively. After removal of any of parts 82, 84 and any subsequent reinstallation or exchange, tie bar 42a is re-inserted through opening 41, hole 24a, and passage 51. Actuator 32 is activated to retract rod 33 reciprocally, and correspondingly move bearing members 21a, 21b. As rod 33 retracts, bearing members 21a, 21b move in opposite directions towards opening 41, hole 24a, and each other to re-establish the holding configuration. With re-establishment of the holding configuration, nut 45 may be configured to lock up against collar portions 50a, 50b of corresponding blocks 26a, 26b, keeping tie bar 42a fixed relative to platen 44b. Tension of tie bar 42a may be re-adjusted during casting operations with system 10 after the holding configuration is re-established by turning nut 45 to tighten or loosen it, as needed. Notably, maintenance of proper tension for all tie bars 42a, 42b is usually desired to prevent binding of platen 44a as it travels along tie bars $^{42}$a, 42b in the directions indicated by the arrows shown in FIG. 1.

In one nonlimiting example, mechanism 20 is utilized on an 850 ton casting machine. For this example, diameter D1 of tie bar 42a is about 9.5 inches which necks down to a diameter D2 of about 7.5 inches at end portion 60. The taper of collar 50 for this example is about 10° relative to axis AA. In other embodiments, mechanism 20 may be utilized with differently sized casting or molding machines. Also, tie bar 42a and collar 50 may be sized and shaped differently as would occur to those skilled in the art.

Other examples of the present invention include a first casting machine platen and a second casting machine platen arranged to move relative to the first platen to perform a casting operation. A number of tie bars are arranged to guide movement of the second platen relative to the first platen during the casting operation, and at least one of these tie bars passes through an opening defined through the first platen and has nut threaded thereon. A tie bar holding mechanism is coupled to the first platen and includes a first bearing member, a second bearing member, and an actuator. The actuator includes a body and a rod selectively moveable relative to the body. The first bearing member is coupled to the body to move therewith and the second bearing member is coupled to the rod to move therewith. The rod has a first position relative to the body to correspondingly position both of the bearing members in a holding configuration to selectively bear against the nut threaded on one of the tie bars. The rod has a second position relative to the body to correspondingly position the first and second bearing members in a releasing configuration to permit withdrawal of one of the tie bars through the opening with the nut threaded thereon.

Another embodiment of the present invention includes a pair of generally straight rails operable to be connected to a casting machine platen about an opening through the platen. A pair of bearing members are also included that are arranged to slidably engage the rails. One of the bearing members has a first collar portion and another of the bearing members has a second collar portion. The collar portions are positioned opposite one another and between the rails, and define a passage to receive the tie bar. An actuator precludes a body and a rod each coupled to a different one of the bearing members when engaged to the rails to provide a mechanism. The rod is positioned between the rails and is selectively extendable and retractable relative to the body to move the bearing members in opposite directions when configured in this mechanism. The mechanism has a first position that orients the collar portions to selectively establish a bearing contact to hold the tie bar in a fixed relation to the platen. The mechanism has a second rod position that orients the collar portions to selectively withdraw the tie bar through the opening of the platen.

Still another embodiment of the present invention includes a platen and a number of tie bars for coupling to the platen with at least one of the tie bars passing through an opening defined through the platen. Also included is a releasable tie bar holding mechanism coupled to the platen. The mechanism includes a pair of bearing members and an actuator including a body and a stem selectively moveable relative to the body. The bearing members move apart from one another and each move away from the opening in response to movement of the stem relative to the body in a first direction. The bearing members move closer to one another and each move closer to the opening in response to movement of the stem relative to the body in a second direction generally opposite the first direction. The stem has a first position relative to the body to position the bearing members in a tie bar fixing configuration. Also, the stem has a second position relative to the body to position the bearing members in a tie bar releasing configuration.

A further embodiment of the present invention includes a casting machine having a number of platens and means for releasably clamping a tie bar in relation to one of the platens to selectively bear against a nut threaded on the tie bar with a pair of bearing members selctively positioned relative to an opening of the platen through which the tie bar passes. The bearing members are slidably coupled to the platen by a pair of generally straight rails. The releasable clamping means includes a hydraulic cylinder actuator having a body coupled to one of the bearing members to move therewith and a rod coupled to another of the bearing members to move therewith. The rod is selectively moveable relative to the body along an axis located generally midway between and approximately parallel to the rails to reciprocally move the bearing members.

Other embodiments include providing or operating a casting machine that has a platen defining a number of openings and a corresponding number of tie bars that each extends through a respective one of the openings. A designated one of the tie bars is selectively held in place relative to the platen with a mechanism. This mechanism includes a pair of bearing members in bearing contact with a nut threaded on the designated tie bar and an actuator. The actuator has a body fixed to one of the members and a selectively moveable rod coupled to another of the members. The rod is extended relative to the body to move the bearing members away from the opening in generally opposite directions. The designated tie bar is withdrawn along with the nut threaded thereon through the respective opening of the platen. A part for the casting machine is changed after this withdrawal. The designated one of the tie bars is inserted through the opening of the platen after the part is changed. The rod of the actuator is retracted relative to the body to move the bearing members towards the opening to engage the nut threaded on the designated tie bar and the nut is turned to adjust tension of the designated tie bar.

Further, all patents, patent applications, and publications cited in the present application are hereby incorporated by reference as if each were specifically and individually indicated to be incorporated by reference and set forth in its entirety herein.

While the invention has been illustrated and described in detail in the drawings and foregoing description, the game is to be considered as illustrative and not restrictive in character, it being understood that only the preferred embodiment has been shown and described and that all changes, equivalents, and modifications that come within the spirit of the invention as defined by the following claims are desired to be protected.

What is claimed is:

1. An apparatus, comprising:
   a first casting machine platen;
   a second casting machine platen arranged to move relative to said first platen to perform a casting operation;
   a number of tie bars arranged to guide movement of said second platen relative to said first platen during said casting operation, at least one of said tie bars passing through an opening defined through said first platen and having a nut threaded thereon;
   a mechanism coupled to said first platen, said mechanism including a first bearing member, a second bearing member, and an actuator aid actuator including a body and a rod selectively moveable relative to said body, said first bearing member being coupled to said body to move therewith and said second bearing member being coupled to said rod to move therewith; and
   wherein said rod has a first position relative to said body to correspondingly position both of said first and second bearing members in a first configuration to selectively bear against said nut threaded on said one of said tie bars, and said rod has a second position relative to said body to correspondingly position said first and second bearing members in a second configuration to permit withdrawal of said one of said tie bars through said opening with said nut threaded thereon.

2. The apparatus of claim 1, wherein said one of said tie bars has an end portion with said nut threaded thereon, and said end portion has a smaller diameter than another portion of said one of said tie rods.

3. The apparatus of claim 1, wherein said actuator includes a hydraulic cylinder and further comprising an operator activated control operably coupled to said cylinder.

4. The apparatus of claim 1, wherein said actuator includes a double-acting hydraulic cylinder with said rod extending further from said body in said second position than said first position.

5. The apparatus of claim 1, further comprising a pair of generally straight rails connected to said first platen, said first and second bearing members slidably engaging said rails and wherein:
   said rod extends along an axis approximately parallel to said rails and said rod is positioned between said rails;
   said first bearing member includes a first collar portion, said second bearing member includes a second collar portion, and said first and second collar portions define a passage receiving a portion of said tie rod therethrough when in said first configuration; and
   one of said first and second bearing members moves over another of said first and second bearing members when changing from said first configuration to said second configuration.

6. An apparatus, comprising;
   a casting or molding machine including a tie bar with a nut threaded thereon and a platen defining an opening arranged to receive said tie bar therethrough;
   a pair of rails arranged to connect to said platen about said opening;
   a pair of bearing members each arranged to slidably engage said rails, one of said bearing members defining a first collar portion and another of said bearing members defining a second collar portion, said first and second collar portions being positioned opposite one another between said rails and defining a passage aligned to receive said tie bar therethrough when said bearing members engage said rails;
   a hydraulic cylinder actuator including a body and a rod each arranged to couple to a different one of said bearing members when said rails are engaged by said bearing members to provide a quick-release mechanism with said rod being positioned between said rails and being selectively positionable relative to said body to move said bearing members in opposite directions when configured in said mechanism, said mechanism being operable when said tie bar extends through said opening and said passage to provide a first rod position that orients said first md second collar portions to selectively bear against said nut to hold said tie bar in fixed relation to said platen and a second rod position that orients said first and second collar portions to selectively withdraw said tie bar through said opening; and
   wherein at least a portion of a first one of said bearing members travels past at least a portion of a second one of said bearing members in an opposite direction when changing said rod between said first and second positions.

7. The apparatus of claim 6, wherein said portion of said first one of said bearing members includes a bridge portion crossing said portion of said second one of said bearing members.

8. The apparatus of claim 7, wherein said first one of said bearing members is coupled to said rod and includes a pair of bridle rail members connected to said bridge portion to move therewith and said rod is threaded into a threaded hole defined by said bridge portion.

9. The apparatus of claim 6, further comprising a pair of stops at opposite ends of said rails to limit motion of said bearing member.

10. The apparatus of claim 9, further comprising a plate configured for connection to said platen, said rails being fixed to said plate, said plate defining an aperture arranged for alignment with said opening through said platen when said plate is connected to said platen.

11. An apparatus, comprising:
   a platen;
   a number of tie bars arranged to couple to said platen during performance of a casting operation, at least one of said tie bars passing through an opening defined through said platen;
   a releasable tie bar holding mechanism coupled to said platen, said mechanism including a pair of bearing members and an actuator including a body and a rod selectively moveable relative to said body, said bearing member moving apart from one another and each moving away from said opening in response to movement of said rod relative to said body in a first direction, and said bearing members moving closer to one another and each moving closer to said opening in response to movement of said rod relative to said body in a second direction generally opposite said first direction; and wherein said rod has a first position relative to said body to position said bearing members in a tie bar holding configuration, and said rod has a second position relative to said body to position said bearing members in a tie bar releasing configuration.

12. The apparatus of claim 11, further comprising a pair of generally straight rails connected to said first platen, said bearing members slidably engaging said rails.

13. The apparatus of claim 12, wherein said rod extends along an axis located generally midway between said rails and approximately parallel to said rails, said bearing members slidably moving along said rails in response to a change in position of said rod relative to said body.

14. The apparatus of claim 11, wherein said one of said tie bars has an end portion with a first nut threaded thereon, said end portion has a smaller diameter than another portion of said one of said tie bars, said end portion and said first nut are sized to pass through said opening with said first nut threaded thereon and said bearing members engage said first nut to clamp said one of said tie bars to said first platen when in said tie bar holding configuration.

15. The apparatus of claim 14, further comprising a second nut threaded on said end portion to engage said first nut, said first nut being arranged to adjust tension of said one of said tie bars and said second nut being arranged to lock said first nut in position.

16. The apparatus of claim 11, wherein said first platen defines a number of openings each correspondingly receiving a respective one of said tie bars therethrough, said tie bars each having at least one of a corresponding number of nuts threaded thereon.

17. The apparatus of claim 11, wherein said actuator is a double-acting hydraulic cylinder, and said rod extends from said body a greater distance for said second position than said first position.

18. The apparatus of claim 11, wherein said bearing members each include a corresponding one of a pair of collar portions, said collar portions are positioned opposite one another, and said collar portions define a passage to receive a portion of said one of said tie bars therethrough and selectively bear against a nut threaded on said one of said tie bars when in said tie bar holding configuration.

19. An apparatus, comprising: a casting machine including a first platen, a second platen arranged to reciprocally move relative to said first platen to perform a casting operation, and a number of tie bars arranged to guide movement of said second platen relative to said first platen during said casting operation, one of said tie bars having a nut threaded thereon and extending through an opening defined through said first platen, said opening being sized to permit withdrawal of said tie bar through said first platen with said nut threaded thereon, said machine further comprising:

means for releasably clamping said one of said tie bars in relation to said first platen by selectively bearing against said nut with a pair of bearing members controllably positionable relative to said opening and being slidably coupled to said first platen by a pair of generally straight rails, said means including a hydraulic cylinder actuator, said actuator having a body coupled to one of said bearing members to move therewith and a rod coupled to another of said bearing members to move therewith, said rod being selectively moveable relative to said body along an axis located generally midway between and approximately parallel to said rails to reciprocally move said bearing members, said bearing members being positioned to prevent said nut threaded on said one of said tie bars from passing through said opening in correspondence with a first position of said rod relative to said body and said bearing members being positioned to allow withdrawal of said one of said tie rods through said first platen in correspondence with a second position of said rod relative to said body.

20. A method, comprising:

operating a casting machine, the machine including a platen defining a number of openings and a corresponding number of tie bars, the tie bars each extending through a respective one of the openings;

holding a designated one of the tie bars extending through the respective one of the openings with a mechanism including a pair of bearing members in bearing contact with a nut threaded on the designated one of the tie bars and a hydraulic cylinder including a body coupled to one of the members and a selectively moveable rod coupled to another of the members;

extending the rod relative to the body to move the bearing members away from the opening in generally opposite directions;

withdrawing the designated one of the tie bars and the nut threaded thereon through the opening of the platen after said extending;

changing at least one part for the casting machine after said withdrawing;

inserting the designated one of the tie bars through the opening of the platen after said changing;

retracting the rod relative to the body to move the bearing members towards the opening;

establishing a bearing contact between the nut threaded on the designated one of the tie bars and the bearing members; and turning the nut during the bearing contact with the bearing members to adjust tension of the designated one of the tie bars.

21. The method of claim 20, wherein said extending includes sliding the bearing members along a pair of generally straight rails connected to the platen.

22. The method of claim 21, wherein at least a portion of one of the bearing members moves over at least a portion of another of the bearing members during said sliding.

23. The method of claim 20, wherein the bearing members close about a portion of the designated one of the tie bars in response to said retracting.

24. The method of claim 20, wherein said extending includes releasing the tie bar from said holding.

* * * * *